US008604413B2

(12) United States Patent
Tobiason (10) Patent No.: US 8,604,413 B2
(45) Date of Patent: Dec. 10, 2013

(54) OPTICAL ENCODER INCLUDING DISPLACEMENT SENSING NORMAL TO THE ENCODER SCALE GRATING SURFACE

(75) Inventor: Joseph Daniel Tobiason, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 200 days.

(21) Appl. No.: 13/159,348

(22) Filed: Jun. 13, 2011

(65) Prior Publication Data

US 2012/0312972 A1    Dec. 13, 2012

(51) Int. Cl.
 *G01D 5/347*  (2006.01)
 *G01B 9/02*  (2006.01)

(52) U.S. Cl.
 USPC .................. 250/237 G; 250/231.13; 356/499

(58) Field of Classification Search
 USPC ............... 250/327 G, 231.13–231.18, 237 G; 356/496, 498, 499, 500
 See application file for complete search history.

(56) References Cited

U.S. PATENT DOCUMENTS

| | | | |
|---|---|---|---|
| 4,776,701 A | 10/1988 | Pettigrew | |
| 4,998,823 A * | 3/1991 | Kitajima | 356/499 |
| 5,327,221 A * | 7/1994 | Saitoh et al. | 356/509 |
| 5,390,022 A * | 2/1995 | Ishizuka et al. | 356/499 |
| 5,569,913 A * | 10/1996 | Ishizuka et al. | 250/237 G |
| 5,579,111 A * | 11/1996 | Maeda | 356/499 |
| 5,621,527 A * | 4/1997 | Kaneda et al. | 356/499 |
| 6,744,520 B2 * | 6/2004 | Chang et al. | 356/499 |
| 7,034,948 B2 * | 4/2006 | Tamiya et al. | 356/499 |
| 7,601,947 B2 | 10/2009 | Makinouchi | |
| 7,907,286 B2 * | 3/2011 | Holzapfel | 356/499 |
| 2003/0076507 A1 * | 4/2003 | Ito | 356/499 |
| 2003/0160966 A1 * | 8/2003 | Osaki et al. | 356/499 |
| 2003/0164950 A1 * | 9/2003 | Chang et al. | 356/499 |
| 2004/0080755 A1 * | 4/2004 | Tamiya et al. | 356/499 |
| 2005/0162661 A1 * | 7/2005 | Yamamoto | 356/499 |
| 2010/0284022 A1 * | 11/2010 | Hsu et al. | 356/499 |
| 2012/0312972 A1 * | 12/2012 | Tobiason | 250/231.1 |

OTHER PUBLICATIONS

Gao, W., "Basic Concept for Three-Axis Surface Encoder" and "Three-Axis Surface Encoder," Tohoku University, Japan, publicly available prior to Jun. 13, 2011, 2 pages.

Gao, W., "Micro and Nano Measurement Instruments," Proceedings of the 10th International Conference of the European Society for Precision Engineering & Nanotechnology, Delft, Netherlands, May 31-Jun. 4, 2010, pp. 235-238.

(Continued)

*Primary Examiner* — John Lee
(74) *Attorney, Agent, or Firm* — Christensen O'Connor Johnson Kindness PLLC (57) ABSTRACT

Disclosed is a displacement sensor configuration, comprising a scale grating disposed in a first direction; and a scale light imaging configuration which includes first and second optical paths and a detector including first and second detector portions. The imaging portion inputs a first scale light component output by the scale grating along the first optical path and transmits the first scale light component to the first detector portion, the imaging portion inputs a second scale light component output by the scale grating along the second optical path and transmits the second scale light component to the second detector portion, the first detector portion is configured to output a first displacement signal indicative of a displacement along the first direction, and the second detector portion is configured to output a second displacement signal indicative of a displacement along a second direction perpendicular to the first direction.

23 Claims, 5 Drawing Sheets

(56) References Cited

OTHER PUBLICATIONS

Liu, C.-H., et al., "Development of a Four-Degrees-of-Freedom Diffraction Sensor," Journal of Physics: Conference Series 48 (2006), International Symposium on Instrumentation Science and Technology, pp. 196-201.

Liu, C.-H., et al., "Five-Degrees-of-Freedom Diffractive Laser Encoder," Applied Optics 48(14):2767-2777, May 10, 2009.

* cited by examiner

OPTICAL ENCODER INCLUDING DISPLACEMENT SENSING NORMAL TO THE ENCODER SCALE GRATING SURFACE

BACKGROUND

1. Field of the Invention

The present invention relates to a displacement sensor configuration, and more particularly to a displacement sensor configuration that optically detects a displacement of a scale light imaging configuration relative to a scale grating.

2. Related Art

There is disclosed an encoder that optically detects a two-dimensional displacement of a scale light imaging configuration relative to a one-dimensional scale grating (see U.S. Pat. No. 7,601,947). Its structure, however, is very complicated.

SUMMARY

It is, therefore, an object of the present invention to provide a displacement sensor configuration with a simpler structure which is capable of detecting a two-dimensional displacement of a scale light imaging configuration relative to a one-dimensional scale grating.

According to an aspect of the present invention, there is provided a displacement sensor configuration, comprising:

a scale grating including grating bars disposed in a first direction, each of the grating bars extending in a second direction that is substantially perpendicular to the first direction and the scale grating defining a set of diffraction planes corresponding to a set of diffractive order angles corresponding to a plane wave perpendicularly incident onto the scale grating, and a scale light imaging configuration, including:

an illumination portion configured to provide illumination light to the scale grating, the plane wave and the illumination light having the same wavelength, an imaging configuration including first and second optical paths, and a detector including first and second detector portions, wherein:

the displacement sensor configuration is configured to output a first scale light component from the scale grating to the imaging portion and along the first optical path which is configured to output the first scale light component to the first detector portion, the displacement sensor configuration is configured to output a second scale light component from the scale grating to the imaging portion and along the second optical path which is configured to output the second scale light component to the second detector portion, and proximate to the scale grating the second optical path is inclined at an angle relative to a direction normal to the scale grating, the angle defined in a plane including the direction normal to the scale grating and the first direction, the first detector portion is configured to receive the first scale light component transmitted along the first optical path and output a first displacement signal that includes at least a first signal component indicative of a displacement of the scale light imaging configuration relative to the scale grating along the first direction, and the second detector portion is configured to receive the second scale light component transmitted along the second optical path and output a second displacement signal that includes the first signal component and a second signal component indicative of a displacement of the scale light imaging configuration relative to the scale grating along a third direction that is perpendicular to the first and second directions.

DESCRIPTION OF THE DRAWINGS

Exemplary embodiments of the present invention will be described in detail based on the following figures, wherein.

DETAILED DESCRIPTION

First Embodiment

Figure 1:
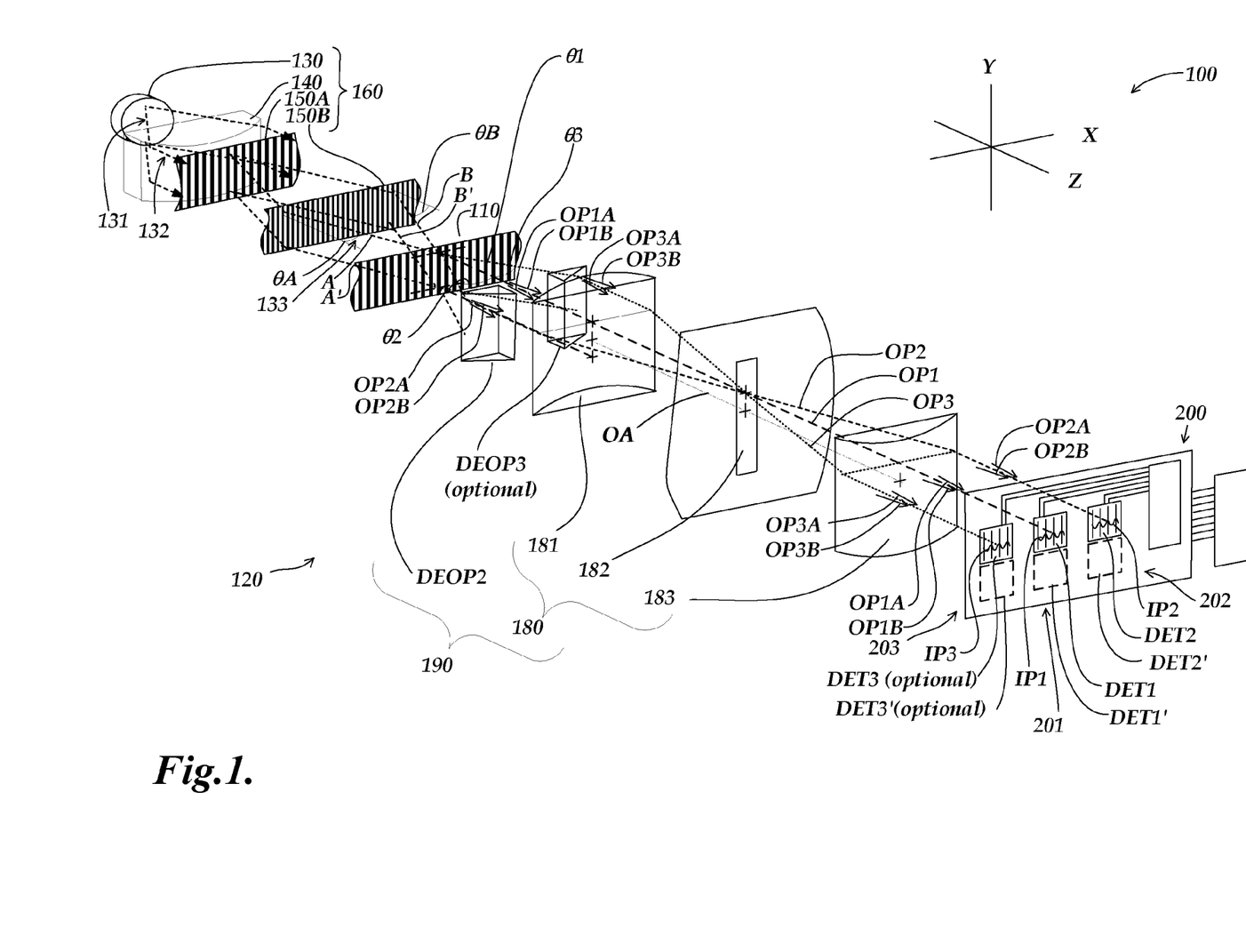
FIG. 1 is a schematic perspective view for explaining a displacement sensor according to a first embodiment of the present invention.
Figure 2:
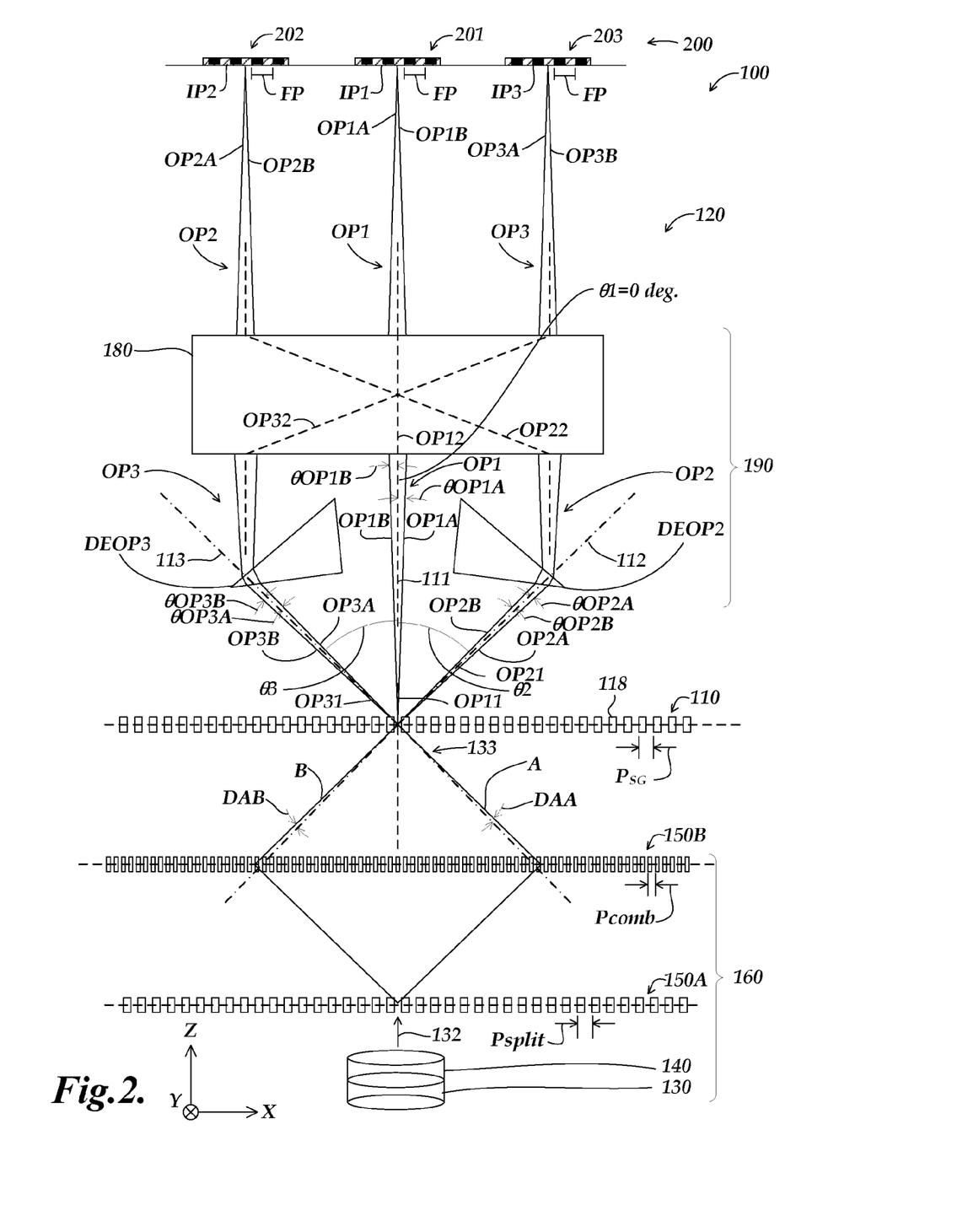
FIG. 2 is a schematic longitudinal view for explaining a displacement sensor according to the first embodiment of the present invention.

Referring to FIGS. 1 and 2, a displacement sensor 100 according to a first embodiment comprises a scale grating 110 and a scale light imaging configuration 120.

The scale grating 110 includes grating bars 118 disposed in an X direction and having a period $P_{SG}$, which in some embodiments is 1 μm. Each of the grating bars 118 extends in a Y direction that is perpendicular to the X direction. The scale grating defines a set of diffraction planes 111, 112, and 113 that respectively correspond to a set of diffractive order angles θ1, θ2, and θ3 corresponding to a plane wave perpendicularly incident onto the scale grating 110. In this embodiment, θ1=0 degree, and θ2=−θ3. The diffraction plane 111 is perpendicular to the X direction, and diffraction planes 112 and 113 are symmetric with respect to the diffraction plane 111. In the embodiment, the scale grating 110 is a transmissive scale grating; however, a reflective scale grating can be used.

The scale light imaging configuration 120 includes an illumination portion 160, an imaging configuration 190, and a detector 200. The illumination portion 160 provides an illumination light beam 133 to the scale grating 110. The illumination portion 160 includes a light source 130, a lens 140, a grating 150A, and a grating 150B. The light source 130 generates a light beam 131 which in some embodiments comprises a wavelength of 0.650 μm. The lens 140 transforms the light beam 131 into a collimated light beam 132 incident on the grating 150A.

The grating 150A has grating bars having a period Psplit and the grating 150B has grating bars having a period Pcomb. In some embodiments, the period Psplit is 0.976 μm and the period Pcomb is 0.500 μm. In alternative embodiments, the period Psplit is 1.026 μm. It should be appreciated that these values are exemplary and not limiting. The grating 150A and the grating 150B generate an illumination light beam 133 which includes an illumination light component A and an illumination light component B from the collimated light beam 132. The illumination light component A is arranged at a deviation angle DAA relative to the diffraction plane 113. The illumination light component B is arranged at a deviation angle DAB relative to the diffraction plane 112. Additionally, in some embodiments, the grating 150A and the grating 150B generate an illumination light component A' and an illumination light component B', each of which is arranged at deviation angles DAA and DBB relative to the diffraction plane 113 and the diffraction plane 112. The illumination light component A' and the illumination light component B' arise from portions of the grating 150A and the grating 150B which are offset along the Y axis direction from where the illumination light component A and the illumination light component B arise. The grating 150A and the grating 150B each comprise a phase grating that is configured to suppress output of zero order light arising from the illumination light 132, and therefore, to suppress illumination light components parallel to a plane that is perpendicular to the X direction, resulting in no illumination light components parallel to the plane. The arrangement of the illumination light components A, A', B, and B' relative to the diffraction planes 111, 112, and 113 is an essential feature of the illumination portion 160. Alternative embodiments of the illumination portion 160 may use a single grating as long as that grating has a pitch value such that it provides a similar arrangement of the illumination light components A, A', B, and B' within the illumination light beam 133, and the illumination light components A, A', B, and B' overlap over an area on the scale grating 110 which is larger than the area imaged by the imaging configuration 190 in order to fill photodetectors of the detector 200.

It should be appreciated that the illumination portion 160 is exemplary and not limiting. Any illumination portion which provides illumination light 133, which comprises the illumination light component A and the illumination light component B which are arranged as described herein and are mutually coherent, may be used.

The illumination light component A is diffracted by the scale grating 110 to generate a scale light component OP1A, a scale light component OP2A, and a scale light component OP3A. The scale light component OP1A arises from the illumination light component A and is output by the scale grating 110 substantially along the diffraction plane 111 such that the scale light component OP1A deviates from the diffraction plane 111 by an angle θOP1A corresponding to the deviation angle DAA. The scale light component OP2A arises from the illumination light component A and is output by the scale grating 110 substantially along the diffraction plane 112 such that the scale light component OP2A deviates from the diffraction plane 112 by an angle θOP2A corresponding to the deviation angle DAA. The scale light component OP3A arises from the illumination light component A and is output by the scale grating 110 substantially along the diffraction plane 113 such that the scale light component OP3A deviates from the diffraction plane 111 by an angle θOP3A corresponding to the deviation angle DAA.

The illumination light component B is diffracted by the scale grating 110 to generate a scale light component OP1B, a scale light component OP2B, and a scale light component OP3B. The scale light component OP1B arises from the illumination light component B and is output by the scale grating 110 substantially along the diffraction plane 111 such that the scale light component OP1B deviates from the diffraction plane 111 by an angle θOP1B corresponding to the deviation angle DAB. The scale light component OP2B arises from the illumination light component B and is output by the scale grating 110 substantially along the diffraction plane 112 such that the scale light component OP2B deviates from the diffraction plane 112 by an angle θOP2B corresponding to the deviation angle DAB. The scale light component OP3B arises from the illumination light component A and is output by the scale grating 110 substantially along the diffraction plane 113 such that the scale light component OP3B deviates from the diffraction plane 113 by an angle θOP3B corresponding to the deviation angle DAB.

Diffractive orders of the diffraction planes 113, 111, and 112 with respect to the illumination light component A are 0, 1, and 2, respectively. Diffractive orders of the diffraction planes 113, 111, and 112 with respect to the illumination light component B are −2, −1, and 0, respectively. The diffractive orders of the diffraction planes 111 and 112 differ from each other by 1. The diffractive orders of the diffraction planes 111 and 113 differ from each other by 1. The diffractive orders of the diffraction planes 112 and 113 differ from each other by 2. The diffractive orders of the diffraction planes 112 and 113, however, can differ from each other by an integer N, where N is at least 1 (the center diffraction plane can be optional, and in the case where N=1, the signal period equals the scale period).

The illumination light components A' and B' are diffracted by the scale grating 110 to generate scale light components OP1A', OP1B', OP2A', OP2B', OP3A', and OP3B' (not shown), which are approximately parallel to the scale light components OP1A, OP1B, OP2A, OP2B, OP3A, and OP3B respectively.

The imaging configuration 190 of the scale light imaging configuration 120 comprises deflecting elements DEOP2 and DEOP3 and a telecentric imaging portion 180. In some embodiments, such as the one shown in FIGS. 1 and 2, the deflecting elements DEOP2 and DEOP3 comprise prisms. In alternative embodiments, the deflecting elements DEOP2 and DEOP3 may comprise gratings or mirrors. The telecentric imaging portion 180 is a double telecentric imaging system including a lens 181, an aperture slit 182 and a lens 183. The aperture slit 182 is disposed at a focal plane of the lens 181 and at a focal plane of the lens 183. The telecentric imaging portion 180 has an optical axis OA that is in a Z direction that is perpendicular to the X direction and the Y direction.

Figure 3:
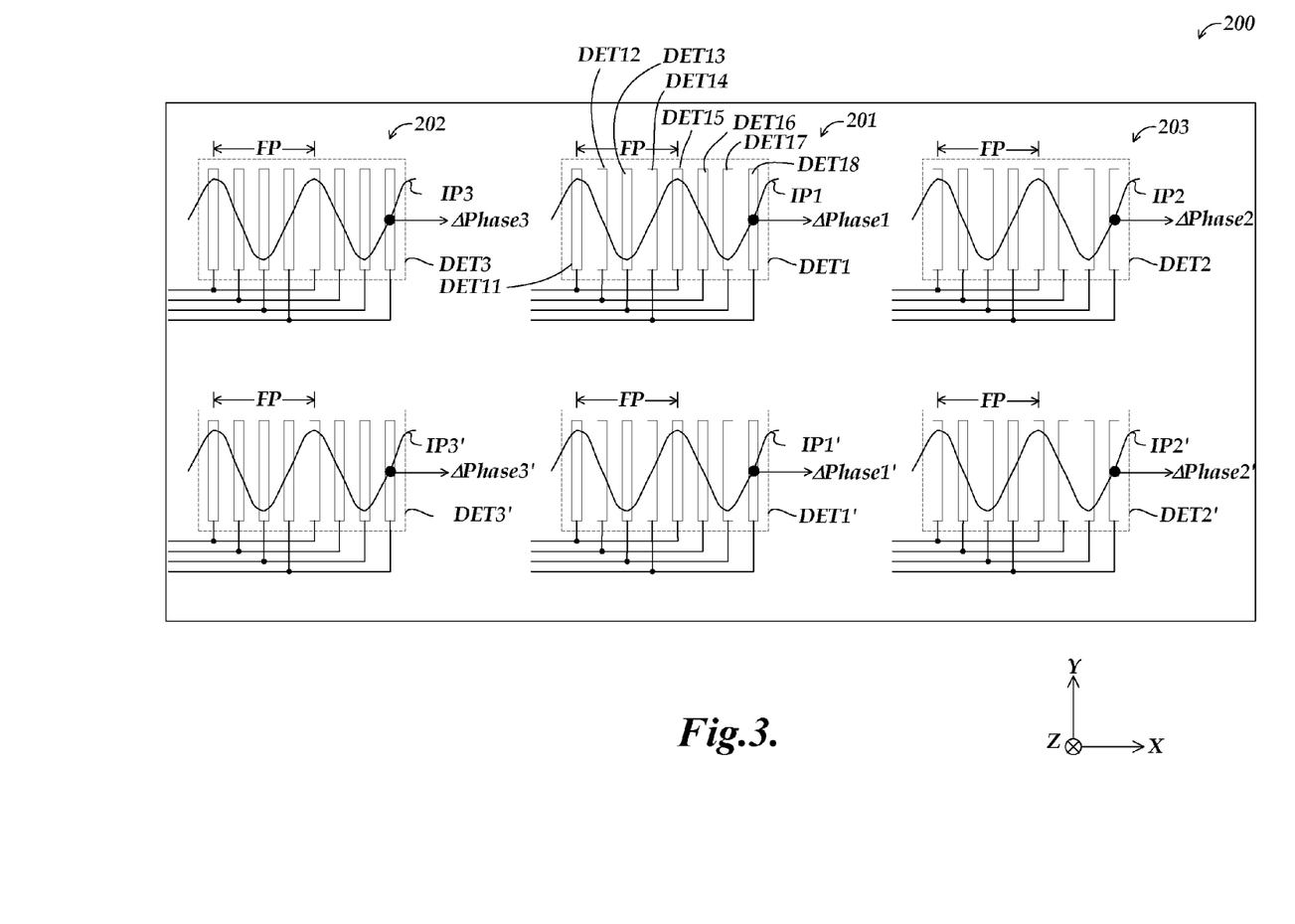
FIG. 3 is a schematic diagram for explaining a detector portion of the displacement sensor according to the first embodiment of the present invention.

The detector 200 has three detector portions 201, 202, and 203 arranged in the X direction (see FIG. 3). The detector portion 201 comprises a detector DET1 and a detector DET1' arranged in the Y direction. The detector portion 202 comprises a detector DET2 and a detector DET2' arranged in the Y direction. The detector portion 203 comprises a detector DET3 and a detector DET3' arranged in the Y direction.

The scale light imaging configuration 120 comprises three optical paths OP1, OP2, and OP3. The optical path OP1 is perpendicular to the X direction, and includes an initial path portion OP11 parallel to the diffraction plane 111, which is perpendicular to the X direction, and a further path portion OP12 through the telecentric imaging portion 180. The initial path portion OP11 of the optical path OP1 and the further path portion OP12 of the optical path OP1 coincide with the optical axis OA of the telecentric imaging portion 180. The scale grating 110 is configured to output the scale light component OP1A and the scale light component OP1B along the initial path portion OP11. The scale light component OP1A along the initial path portion OP11 of the optical path OP1 deviates from alignment parallel to the optical axis OA of the telecentric imaging portion 180 by the angle θOP1A corresponding to the deviation angle DAA, and the scale light component OP1B along the initial path portion OP11 of the optical path OP1 deviates from alignment parallel to the optical axis OA of the telecentric imaging portion 180 by the angle θOP1B corresponding to the deviation angle DAB, as the scale light component OP1A and the scale light component OP1B are output from the scale grating 110 and input to the telecentric imaging portion 180. The telecentric imaging portion 180 is configured to output the scale light component OP1A and the scale light component OP1B to the detector portion 201. The detector portion 201 is configured to receive the scale light component OP1A and the scale light component OP1B transmitted along the optical path OP1 and output a displacement signal that includes only a signal component indicative of a displacement of the scale light imaging configuration 120 relative to the scale grating 110 along the X direction.

The optical path OP2 comprises an initial path portion OP21 parallel to the diffraction plane 112, which is not parallel to the optical axis OA of the telecentric imaging portion 180, a further path portion OP22 through the telecentric imaging portion 180, and a deflecting element DEOP2, which functions as an optical path deflection element and is positioned between the initial path portion OP21 and the further path portion OP22. The scale light component OP2A and the scale light component OP2B are output by the scale grating 110 along the initial path portion OP21. Along the initial path portion OP21 of the optical path OP2, the scale light component OP2A deviates from the diffraction plane 112 by the angle θOP2A corresponding to the deviation angle DAA and along the initial path portion OP21 of the optical path OP2, the scale light component OP2B deviates from the diffraction plane 112 by the angle θOP2B corresponding to the deviation angle DAB, as the scale light component OP2A and the scale light component OP2B are output from the scale grating 110. The deflecting element DEOP2 is configured to receive the scale light component OP2A and the scale light component OP2B along the initial path portion OP21 of the optical path OP2, and deflect the scale light component OP2A and the scale light component OP2B such that the scale light component OP2A and the scale light component OP2B deviate from alignment parallel to the optical axis OA of the telecentric imaging portion 180 by the amounts respectively corresponding to the deviation angles DAA and DAB, as the scale light component OP2A and the scale light component OP2B are input to the telecentric imaging portion 180. The telecentric imaging portion 180 is configured to output the scale light component OP2A and the scale light component OP2B to the detector portion 202. The detector portion 202 is configured to receive the scale light component OP2A and the scale light component OP2B transmitted along the optical path OP2 and output a displacement signal that includes a signal component indicative of a displacement of the scale light imaging configuration 120 relative to the scale grating 110 along the X direction and a signal component indicative of a displacement of the scale light imaging configuration 120 relative to the scale grating 110 along the Z direction.

The optical path OP3, which is optional, comprises an initial path portion OP31 parallel to the diffraction plane 113, which is not parallel to the optical axis OA of the telecentric imaging portion 180, a further path portion OP32 through the telecentric imaging portion 180, and a deflecting element DEOP3, which functions as an optical path deflection element and is positioned between the initial path portion OP31 and the further path portion OP32. The scale light component OP3A and the scale light component OP3B are output by the scale grating 110 along the initial path portion OP31. Along the initial path portion OP31, the scale light component OP3A of the optical path OP3 deviates from the diffraction plane 113 by an angle θOP3A corresponding to the deviation angle DAA and the scale light component OP3B substantially along the initial path portion OP31 of the optical path OP3 deviates from the diffraction plane 113 by the angle θOP3B corresponding to the deviation angle DAB, as the scale light component OP3A and the scale light component OP3B are output from the scale grating 110.

The deflecting element DEOP3 is configured to receive the scale light component OP3A and the scale light component OP3B substantially along the initial path portion OP31 of the optical path OP3, and deflect the scale light component OP3A and the scale light component OP3B such that the scale light component OP3A and the scale light component OP3B deviate from alignment parallel to the optical axis OA of the telecentric imaging portion 180 by the amounts respectively corresponding to the deviation angles DAA and DAB, as the scale light component OP3A and the scale light component OP3B are input to the telecentric imaging portion 180. The telecentric imaging portion 180 is configured to output the scale light component OP3A and the scale light component OP3B to the detector portion 203. The detector portion 203 is configured to receive the scale light component OP3A and the scale light component OP3B transmitted along the optical path OP3 and output a displacement signal that includes a signal component indicative of a displacement of the scale light imaging configuration 120 relative to the scale grating 110 along the X direction and a signal component indicative of a displacement of the scale light imaging configuration 120 relative to the scale grating 110 along the Z direction.

The scale light components OP1A', OP1B', OP2A', OP2B', OP3A', and OP3B' follow optical paths OP1', OP2', and OP3' which are parallel to the optical paths OP1, OP2, and OP3 respectively. They are each output by the telecentric imaging portion 180 in similar pairs to the detector portions 201, 202, and 203, and more specifically to the detectors DET1', DET2', and DET3'. The detectors DET1', DET2', and DET3' are optional elements which may be used to detect additional degrees of freedom as discussed in further detail below.

Referring to FIG. 3, the detector DET1 is configured to receive an intensity pattern IP1 produced by interference of the scale light component OP1A and the scale light component OP1B. The detector DET1' is configured to receive an intensity pattern IP1' produced by interference of the scale light component OP1A' and the scale light component OP1B'. The detector DET2 is configured to receive an intensity pattern IP2 produced by interference of the scale light component OP2A and the scale light component OP2B. The detector DET2' is configured to receive an intensity pattern IP2' produced by interference of the scale light component OP2A' and the scale light component OP2B'. The detector DET3 is configured to receive an intensity pattern IP3 produced by interference of the scale light component OP3A and the scale light component OP3B. The detector DET3' is configured to receive an intensity pattern IP3' produced by interference of the scale light component OP3A' and the scale light component OP3B'.

Each of the intensity patterns IP1, IP1', IP2, IP2', IP3, and IP3' comprises a periodic pattern of fringes with a fringe pitch FP. In exemplary embodiments where N is 1, the fringe pitch FP is equal to the period $P_{SG}$. It should be appreciated that in various embodiments, the period Psplit is slightly less than two times the period Pcomb, but not precisely two times the period Pcomb. If Psplit were precisely two times the period Pcomb, i.e., 1 µm in the embodiment described herein, then both the deviation angle DAA and the deviation angle DAB would be zero and respective pairs of scale light components incident upon the detectors would follow the same optical paths and would not interfere to produce the respective intensity patterns. Therefore, a period Psplit, which is slightly less or slightly more than two times the period Pcomb, is essential to provide intensity patterns which may be used for position measurements in accordance with this embodiment.

The detectors DET1, DET1', DET2, DET2', DET3, and DET3' are of the same structure, and therefore, the detectors will be explained taking the detector DET1 as an example. The detector DET1 has photodetectors DET11-DET18 periodically disposed in the X direction. Four photodetectors DET11-DET14 and four photodetectors DET15-DET18 respectively correspond to one cycle of the intensity pattern IP1. Four photodetectors DET11-DET14 and four photodetectors DET15-DET18 are connected in parallel.

For the detector DET1, a quadrature signal phase change Δphase1 of the intensity pattern IP1 due to a displacement ΔX in the X direction, is expressed:

$$\Delta Phase1 = N\frac{2\pi \Delta X}{P_{SG}} \qquad \text{EQ1}$$

where:
N is an integer corresponding to the difference between the diffractive order number of the scale light components OP1A and OP1B that travel together along an optical path OP1 and the difference in this case is 1−(−1)=2. $P_{SG}$ is the pitch of grating bars 118 of the scale grating 110.

For the detector DET1', a quadrature signal phase change Δphase1' of the intensity pattern IP1' due to a displacement ΔX' in the X direction, is expressed:

$$\Delta Phase1' = N\frac{2\pi \Delta X'}{P_{SG}} \qquad \text{EQ2}$$

where:
N is an integer corresponding to the difference between the diffractive order number of the scale light components OP1A' and OP1B' that travel together along an optical path OP1' and the difference in this case is 1−(−1)=2. $P_{SG}$ is the pitch of grating bars 118 of the scale grating 110.

For the detector DET2, a quadrature signal phase change ΔPhase2 of the intensity pattern IP2 due to a displacement ΔX in the X direction and a displacement ΔZ2 in the Z direction, is expressed:

$$\Delta Phase2 = N\left[\frac{2\pi \Delta X}{P_{SG}} - 2\pi \frac{\tan(\theta 2)\cdot \Delta Z_2}{P_{SG}}\right] \qquad \text{EQ3}$$

where:
N is an integer corresponding to the difference between the diffractive order number of the scale light components OP2A and OP2B that travel together along an optical path OP2 and the difference in this case is 2-0=2. $P_{SG}$ is the pitch of grating bars 118 of the scale grating 110. ΔZ2 is the Z displacement at the location on the scale 110 that is imaged onto the detector DET2. θ2 is the angle of incidence of the optical path OP2 on the scale grating 110 and is the diffraction angle of the diffraction plane 112.

For the detector DET2', a quadrature signal phase change ΔPhase2' of the intensity pattern IP2' due to a displacement ΔX' in the X direction and a displacement ΔZ2' in the Z direction, is expressed:

$$\Delta Phase2' = N\left[\frac{2\pi \Delta X'}{P_{SG}} - 2\pi \frac{\tan(\theta 2)\cdot \Delta Z_2'}{P_{SG}}\right] \qquad \text{EQ4}$$

where:
N is an integer corresponding to the difference between the diffractive order number of the scale light components OP2A and OP2B that travel together along an optical path OP2 and the difference in this case is 2−=2. $P_{SG}$ is the pitch of grating bars 118 of the scale grating 110. ΔZ2 is the Z displacement at the location on the scale 110 that is imaged onto the detector DET2'. θ2 is the angle of incidence of the optical path OP2 on the scale grating 110 and is the diffraction angle of the diffraction plane 112.

For the detector DET3, a quadrature signal phase change ΔPhase3 of the intensity pattern IP3 due to a displacement ΔX in the X direction and a displacement ΔZ3 in the Z direction, is expressed:

$$\Delta Phase3 = N\left[\frac{2\pi \Delta x}{P_{SG}} + 2\pi \frac{\tan(\theta 3)\cdot \Delta Z_3}{P_{SG}}\right] \qquad \text{EQ5}$$

where:
N is an integer corresponding to the difference between the diffractive order number of the scale light components OP3A and OP3B that travel together along an optical path OP3 and the difference in this case is 0−(−2)=2. $P_{SG}$ is the pitch of grating bars 118 of the scale grating 110. ΔZ3 is the Z displacement at the location on the scale 110 that is imaged onto the detector DET3. θ3 is the angle of incidence of the optical path OP3 on the scale grating 110 and is the diffraction angle of the diffraction plane 113.

For the detector DET3', a quadrature signal phase change ΔPhase3' of the intensity pattern IP3' due to a displacement ΔX' in the X direction and a displacement ΔZ3' in the Z direction, is expressed:

$$\Delta Phase3' = N\left[\frac{2\pi \Delta x'}{P_{SG}} + 2\pi \frac{\tan(\theta 3)\cdot \Delta Z_3'}{P_{SG}}\right] \qquad \text{EQ6}$$

where:
N is an integer corresponding to the difference between the diffractive order number of the scale light components OP3A and OP3B that travel together along an optical path OP3 and the difference in this case is 0−(−2)=2. $P_{SG}$ is the pitch of grating bars 118 of the scale grating 110. ΔZ3 is the Z displacement at the location on the scale 110 that is imaged onto the detector DET3. θ3 is the angle of incidence of the optical path OP3 on the scale grating 110 and is the diffraction angle of the diffraction plane 113.

EQ1 can be solved to find ΔX in terms of the phase change Δphase1, and therefore, a displacement in the X direction between the scale grating 110 and the scale light imaging configuration 120 is obtained. EQ1 can be subtracted from EQ3, and the results solved to find ΔZ2 in terms of the phase changes ΔPhase2 and ΔPhase1, and therefore, a displacement in the Z direction between the scale grating 110 and the scale light imaging configuration 120 is obtained.

EQ1 can be subtracted from EQ3, and the results solved to find ΔZ3 in terms of ΔPhase3 and ΔPhase1 signal changes, and therefore, a displacement in the Z direction between the scale grating 110 and the scale light imaging configuration 120 is obtained.

An average ΔZ can be calculated in terms of ΔZ2 and ΔZ3. EQ2 can be solved to find ΔX' in terms of the phase change Δphase1'. EQ1' can be subtracted from EQ3', and the results solved to find ΔZ2' in terms of the phase changes ΔPhase2' and ΔPhase1'. EQ1' can be subtracted from EQ3, and the results solved to find ΔZ3' in terms of the phase changes ΔPhase3' and ΔPhase1'. When the offsets between the detectors in the X and Y direction are known, the values of ΔX', ΔZ2' and ΔZ3' may be compared with the values of ΔX, ΔZ2 and ΔZ3 to determine a pitch, a yaw, or a roll of the scale grating 110.

The fringe pitch FP must be small enough such that at least one period of fringes in a respective intensity pattern is incident upon a respective detector. However, design considerations place an upper and lower bound on the size of each detector. Thus, in various embodiments, the fringe pitch FP is at least 1 μm and no greater than 200 μm. In some embodiments, the fringe pitch FP is at least 15 μm and no greater than 50 μm.

It should be appreciated that the deviation angle DAA, the deviation angle DBB, the diffractive order angles θ1, θ2, and θ3 and the magnification of the telecentric imaging portion 180 may be selected with values that give a desired fringe pitch FP which matches the spacing of the photodetectors of the detector 200. The magnification of the telecentric imaging portion 180 shown in this embodiment is −1. However, this is exemplary and not limiting. Other values of magnification may be used with matching values of the deviation angle DAA, the deviation angle DBB, and the diffractive order angles θ1, θ2, and θ3, provided that the illumination light components A, A', B, and B' overlap over an area on the scale grating 110 which is larger than the area imaged by the imaging configuration 190.

In alternative embodiments, as the period Psplit may approaches two times the period Pcomb such that the deviation angle DAA and the deviation angle DBB approach zero. This requires either a different detector configuration than the detector 200 or a different grating configuration than the grating 110. A detector array may be used with an increasing detector element period to match the increasing fringe pitch FP for values up 100 to 500 μm or larger. If the fringe pitch FP is large enough (e.g., up to a few millimeters or more), discrete detectors may be used instead of the detector 200. For even larger values of the fringe pitch FP (e.g., much greater than 1 mm), a detector which comprises polarizing beam splitters with discrete detectors may be used (e.g., similar to that disclosed in U.S. Pat. No. 4,776,701 or that disclosed in "Five-Degrees-of-Freedom Diffractive Laser Encoder" by Liu et al., Applied Optics Vol. 48, No. 14, 10 May 2009). A grating which comprises periodic regions which correspond to the widths of the photodetectors DET11-DET14 and DET15-DET18 may be used with phase shifts that give the desired phase output for corresponding photodetectors for large values of the fringe pitch FP. However, it should be appreciated that such alternative embodiments may require detectors which are less compact and more expensive or gratings which are more complex and costly to manufacture.

Second Embodiment

Figure 4:
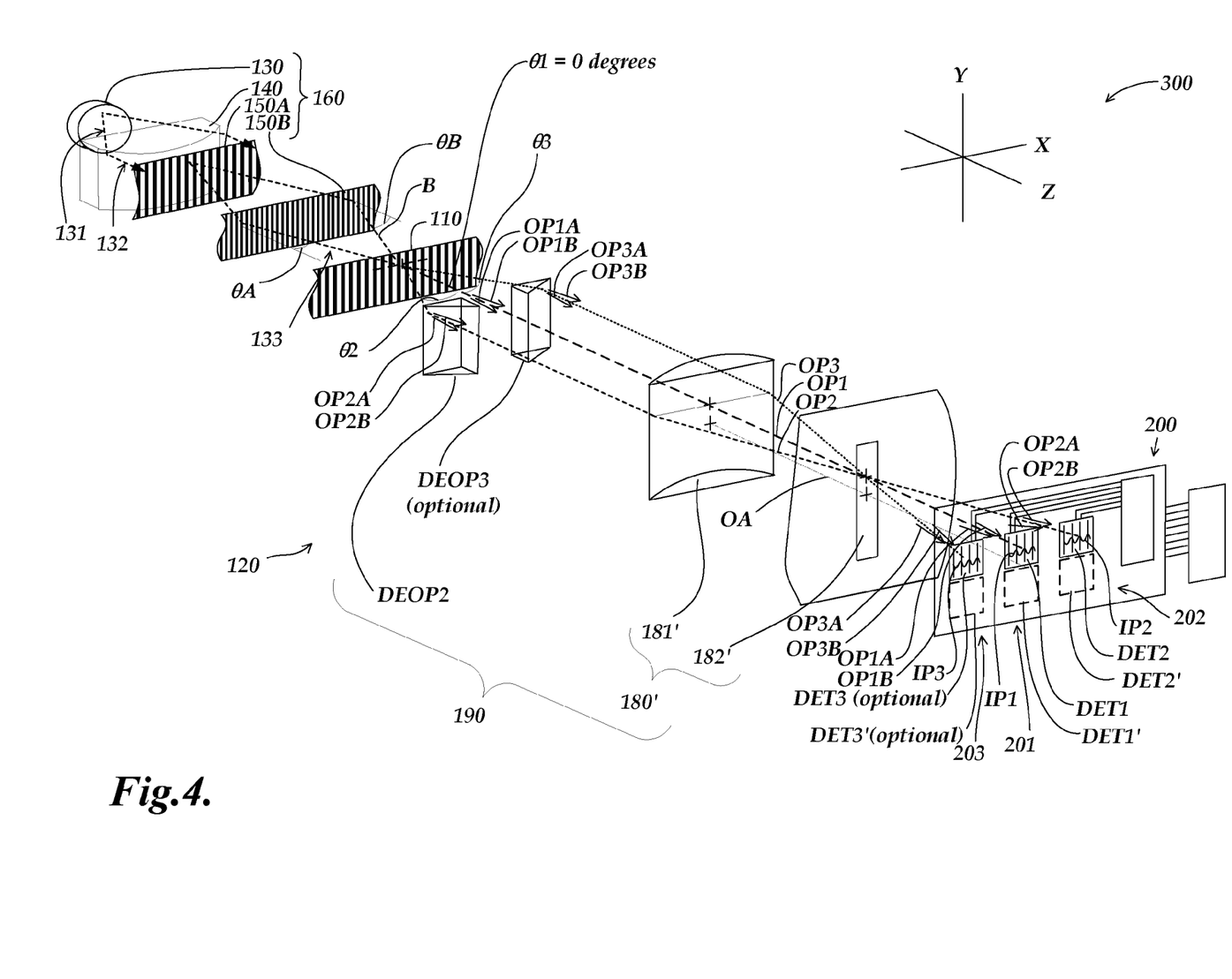
FIG. 4 is a schematic perspective view for explaining a displacement sensor according to a second embodiment of the present invention.

Referring to FIG. 4, a displacement sensor 300 according to a second embodiment differs from the displacement sensor 100 according to the first embodiment in that the telecentric imaging portion 180 of the displacement sensor 100 is a double telecentric imaging system, whereas the telecentric imaging portion 180' of the displacement sensor 300 is a single telecentric imaging system including a lens 181' and an aperture slit 182'. The remaining configurations of both displacement sensors 100 and 300 are the same.

Third Embodiment

Figure 5:
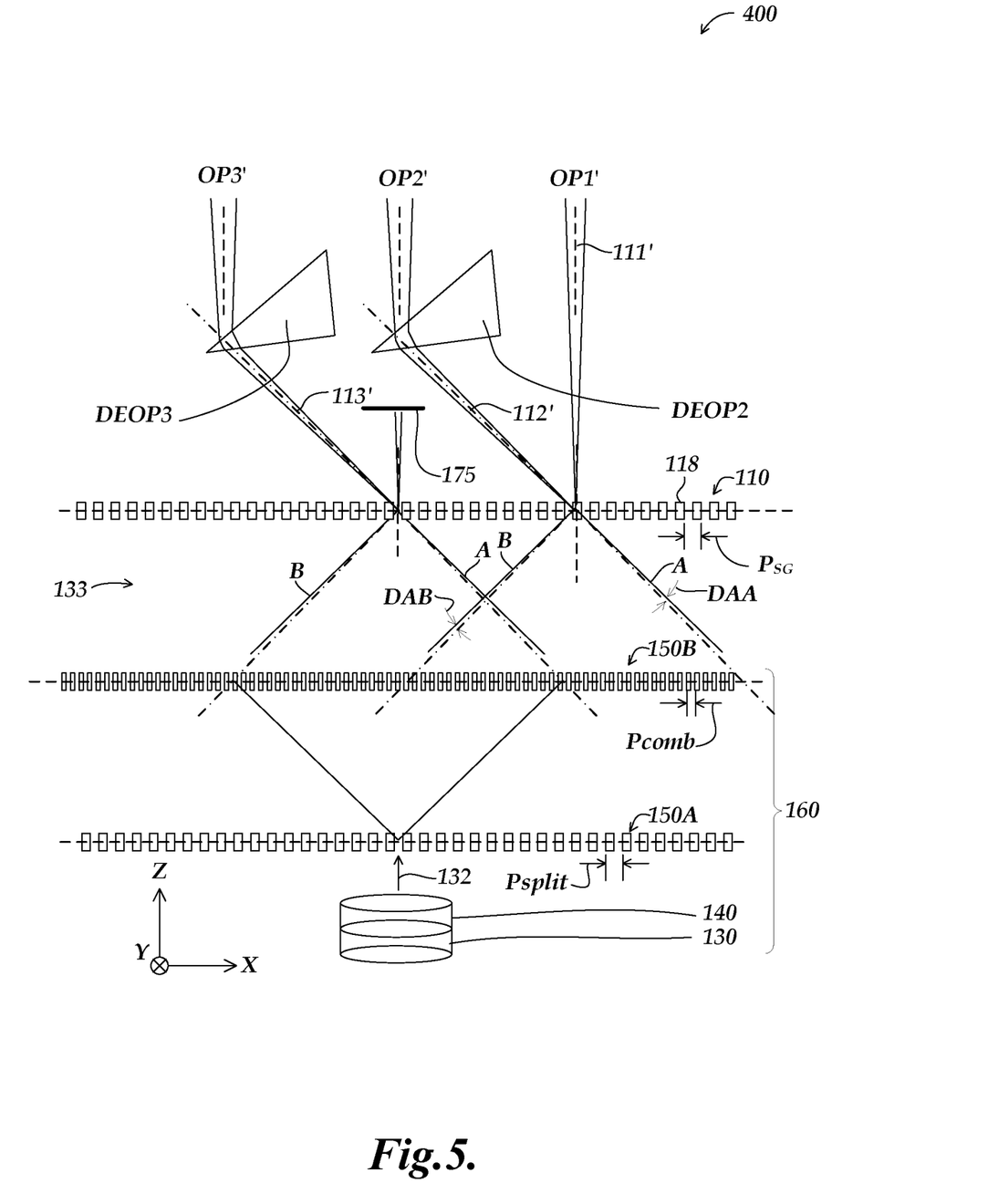
FIG. 5 is a schematic longitudinal view for explaining a displacement sensor according to a third embodiment of the present invention.

Referring to FIG. 5, a displacement sensor 400 according to a third embodiment differs from the displacement sensor 100 according to the first embodiment in that in the first embodiment, the diffraction plane 111' is perpendicular to the X direction, and diffraction planes 112' and 113' are symmetric with respect to the diffraction plane 111', whereas in the third embodiment, the diffraction plane 111' is perpendicular to the X direction, and the diffraction planes 112' and 113' are in parallel with each other. In addition, the displacement sensor 400 comprises a blocking element 175 which is positioned such that it blocks a +1 order diffraction component arising from the illumination light component A and a −1 order diffraction component arising from the illumination light component B. These components may interfere with scale light components along the optical path OP2'. The remaining configurations of both embodiments are the same.

Although various exemplary embodiments have been shown and described, the invention is not limited to the embodiments shown. Therefore, the scope of the invention is intended to be limited solely by the scope of the claims that follow.

The embodiments of the invention in which an exclusive property or privilege is claimed are defined as follows:

1. A displacement sensor configuration, comprising:
a scale grating including grating bars disposed in a first direction, each of the grating bars extending in a second direction that is substantially perpendicular to the first direction and the scale grating defining a set of diffraction planes corresponding to a set of diffractive order angles corresponding to a hypothetical plane wave perpendicularly incident onto the scale grating, and
a scale light imaging configuration, including:
an illumination portion configured to provide illumination light to the scale grating, the hypothetical plane wave and the illumination light having the same wavelength,
an imaging configuration including first and second optical paths, and
a detector including first and second detector portions, wherein:
the displacement sensor configuration is configured to output a first scale light component from the scale grating to the imaging configuration and along the first optical path which is configured to output the first scale light component to the first detector portion,
the displacement sensor configuration is configured to output a second scale light component from the scale grating to the imaging configuration and along the second optical path which is configured to output the second scale light component to the second detector portion, and proximate to the scale grating the second optical path is inclined at an angle relative to a direction normal to the scale grating, the angle defined in a plane including the direction normal to the scale grating and the first direction,
the first detector portion is configured to receive the first scale light component transmitted along the first optical path and output a first displacement signal that includes at least a first signal component indicative of a displacement of the scale light imaging configuration relative to the scale grating along the first direction, and
the second detector portion is configured to receive the second scale light component transmitted along the second optical path and output a second displacement signal that includes the first signal component and a second signal component indicative of a displacement of the scale light imaging configuration relative to the scale grating along a third direction that is perpendicular to the first and second directions.

2. The displacement sensor configuration of claim 1, wherein:
   the illumination portion is configured to provide illumination light that includes first and second illumination light components, the first illumination light component being arranged at a first deviation angle relative to a first diffraction plane of the set of diffraction planes and the second illumination light component being arranged at a second deviation angle relative to a second diffraction plane of the set of diffraction planes,
   the first scale light component includes first and second scale light sub-components, the first scale light sub-component arises from the first illumination light component and is output by the scale grating such that the first scale light sub-component deviates from the first diffraction plane by an amount corresponding to the first deviation angle, and the second scale light sub-component arises from the second illumination light component and is output by the scale grating such that the second scale light sub-component deviates from the first diffraction plane by an amount corresponding to the second deviation angle,
   the second scale light component includes third and fourth scale light sub-components, the third scale light sub-component arises from the first illumination light component and is output by the scale grating such that the third scale light sub-component deviates from the first diffraction plane by an amount corresponding to the first deviation angle, and the fourth scale light sub-component arises from the second illumination light component and is output by the scale grating such that the fourth scale light sub-component deviates from the second diffraction plane by an amount corresponding to the second deviation angle, and
   the first detector portion is configured to receive a first intensity pattern produced by interference of the first and second scale light sub-components, and the second detector portion is configured to receive a second intensity pattern produced by interference of the third and fourth scale light sub-components.

3. The displacement sensor configuration of claim 2, wherein:
   the first diffraction plane is substantially perpendicular to the first direction, and
   the first displacement signal includes only the first signal component.

4. The displacement sensor configuration of claim 3, wherein a difference between the diffractive orders of the first and second diffraction planes is 1.

5. The displacement sensor configuration of claim 3, wherein a difference between the first and second displacement signals is indicative of the displacement of the scale light imaging configuration relative to the scale grating along the third direction.

6. The displacement sensor configuration of claim 1, wherein the illumination portion is configured to provide no illumination light components parallel to a plane that is perpendicular to the first direction.

7. The displacement sensor configuration of claim 6, wherein the illumination portion comprises a phase grating that is configured to provide the illumination light and to suppress illumination light components parallel to the plane that is perpendicular to the first direction.

8. The displacement sensor configuration of claim 1, wherein the scale grating comprises a phase grating that is configured to suppress output of zero order light arising from the illumination light.

9. The displacement sensor configuration of claim 2, wherein the diffractive orders of the first and second diffraction planes differ from each other by an integer N, where N is at least 1.

10. The displacement sensor configuration of claim 9, wherein N is 2.

11. The displacement sensor configuration of claim 2, wherein:
    the imaging configuration includes a telecentric imaging portion, the first optical path includes an initial path portion substantially parallel to the first diffraction plane, and a further path portion through the telecentric imaging portion, and
    the second optical path includes an initial path portion substantially parallel to the second diffraction plane, and a further path portion through the telecentric imaging portion.

12. The displacement sensor configuration of claim 3, wherein:
    the imaging configuration includes a telecentric imaging portion having an optical axis that is substantially perpendicular to the first and second directions,
    the first optical path includes an initial path portion substantially parallel to the first diffraction plane, and a further path portion through the telecentric imaging portion, and
    the second optical path includes an initial path portion substantially parallel to the second diffraction plane, a further path portion through the telecentric imaging portion and an optical path deflection element positioned between the initial path portion and the telecentric imaging portion, the optical path deflection element of the second optical path is configured to receive the second scale light component traveling substantially along the second diffraction plane along the initial path portion of the second optical path, and deflect the second scale light component such that the second scale light component travels in a direction parallel to the optical axis along the further path portion of the second optical path.

13. The displacement sensor configuration of claim 2, wherein:
    the imaging configuration includes a telecentric imaging portion having an optical axis that is substantially perpendicular to the first and second directions,
    the first optical path includes an initial path portion substantially parallel to the first diffraction plane, and a further path portion through the telecentric imaging portion,
    the second diffraction plane is not parallel to the optical axis of the telecentric imaging portion, and
    the second optical path includes an initial path portion substantially parallel to the second diffraction plane, a further path portion through the telecentric imaging portion, and an optical path deflection element positioned between the initial path portion and the telecentric imaging portion, the optical path deflection element of the second optical path is configured to receive the second scale light component substantially along the initial path portion of the second optical path, and deflect the second scale light component such that the third and fourth scale light sub-components deviate from alignment parallel to the optical axis of the telecentric imaging portion by amounts respectively corresponding to the first and second deviation angles, as the third and fourth scale light sub-components are input to the telecentric imaging portion.

14. The displacement sensor configuration of claim 13, wherein the first diffraction plane is parallel to the optical axis of the telecentric imaging portion, and the first and second scale light sub-components along the initial path portion of the first optical path deviate from alignment parallel to the optical axis of the telecentric imaging portion by the amounts corresponding to the first and second deviation angles, as the first and second scale light sub-components are output from the scale grating and input to the telecentric imaging portion.

15. The displacement sensor configuration of claim 14, wherein the initial path portion of the first optical path and the further path portion of the first optical path substantially coincide with the optical axis of the telecentric imaging portion.

16. The displacement sensor configuration of claim 12, wherein the optical path deflection element includes one of a grating and a prism.

17. The displacement sensor configuration of claim 12, wherein the telecentric imaging portion comprises one of a single telecentric imaging system including a lens and an aperture and a double telecentric imaging system including a first lens, an aperture, and a second lens in this order.

18. The displacement sensor configuration of claim 1, wherein the scale grating is one of a reflective scale grating and a transmissive scale grating.

19. The displacement sensor configuration of claim 1, wherein:
the first detector portion includes first and second sub-detector portions arranged in the second direction, and
the second detector portion includes third and fourth sub-detector portions arranged in the second direction.

20. The displacement sensor configuration of claim 1, wherein:
the imaging configuration further includes a third optical path,
the detector further includes a third detector portion,
the displacement sensor configuration is configured to output a third scale light component from the scale grating to the imaging configuration and along the third optical path which is configured to output the third scale light component to the third detector portion, and
the third detector portion is configured to receive the third scale light component transmitted along the third optical path and output a third displacement signal that includes the first signal component and a third signal component indicative of a second displacement of the scale light imaging configuration relative to the scale grating along the third direction.

21. The displacement sensor configuration of claim 20, wherein:
the first detector portion includes first and second sub-detector portions arranged in the second direction,
the second detector portion includes third and fourth sub-detector portions arranged in the second direction, and
the third detector portion includes fifth and sixth sub-detector portions arranged in the second direction.

22. The displacement sensor configuration of claim 20, wherein:
the third scale light component includes fifth and sixth scale light sub-components, the fifth scale light sub-component arises from the first illumination light component and is output by the scale grating such that the fifth scale light sub-component deviates from a third diffraction plane by an amount corresponding to the first deviation angle, and the sixth scale light sub-component arises from the second illumination light component and is output by the scale grating such that the sixth scale light sub-component deviates from the third diffraction plane by an amount corresponding to the second deviation angle, and
the first diffraction plane is substantially perpendicular to the first direction, and the second and the third diffraction planes are symmetric with respect to the first diffraction plane.

23. The displacement sensor configuration of claim 20, wherein:
the third scale light component includes fifth and sixth scale light sub-components, the fifth scale light sub-component arises from the first illumination light component and is output by the scale grating such that the fifth scale light sub-component deviates from a third diffraction plane by an amount corresponding to the first deviation angle, and the sixth scale light sub-component arises from the second illumination light component and is output by the scale grating such that the sixth scale light sub-component deviates from the third diffraction plane by an amount corresponding to the second deviation angle, and
the first diffraction plane is substantially perpendicular to the first direction, and the second and the third diffraction planes are in parallel with each other.

* * * * *